United States Patent
Herzig et al.

(10) Patent No.: US 10,733,384 B2
(45) Date of Patent: *Aug. 4, 2020

(54) EMOTION DETECTION AND EXPRESSION INTEGRATION IN DIALOG SYSTEMS

(71) Applicant: INTERNATIONAL BUSINESS MACHINES CORPORATION, Armonk, NY (US)

(72) Inventors: Jonathan Herzig, Tel-Aviv (IL); David Konopnicki, Haifa (IL); Tommy Sandbank, Herzliyya (IL); Michal Shmueli-Scheuer, Tel-Aviv (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/434,496

(22) Filed: Jun. 7, 2019

(65) Prior Publication Data

US 2019/0286705 A1    Sep. 19, 2019

Related U.S. Application Data

(63) Continuation of application No. 15/844,877, filed on Dec. 18, 2017, now Pat. No. 10,372,825.

(51) Int. Cl.
*G06F 40/30* (2020.01)
*G10L 25/63* (2013.01)
*G06F 40/35* (2020.01)
*G06F 40/295* (2020.01)

(52) U.S. Cl.
CPC .............. *G06F 40/30* (2020.01); *G06F 40/35* (2020.01); *G10L 25/63* (2013.01); *G06F 40/295* (2020.01)

(58) Field of Classification Search
CPC .. G06F 17/2785; G06F 17/279; G06F 17/278; G10L 25/63
See application file for complete search history.

(56) References Cited

U.S. PATENT DOCUMENTS

| 10,372,825 | B2* | 8/2019 | Herzig | G10L 25/63 |
|---|---|---|---|---|
| 2006/0127834 | A1 | 6/2006 | Szwajkowski | |
| 2014/0140497 | A1* | 5/2014 | Ripa | H04M 3/5133 |
| | | | | 379/265.06 |
| 2014/0314225 | A1* | 10/2014 | Riahi | G06Q 30/02 |
| | | | | 379/265.09 |

(Continued)

OTHER PUBLICATIONS

Cavalluzzi et al., "Affective Advice Giving Dialogs", Tutorial and Research Workshop on "Affective Dialogue Systems", http://www.di.uniba.it/intint/people/papers/ADS'04.pdf, Jun. 2004, pp. 1-12.

(Continued)

*Primary Examiner* — Stella L. Woo
(74) *Attorney, Agent, or Firm* — Michael O'Keefe

(57) ABSTRACT

Utilizing a computing device to detect and respond to emotion in dialog systems. The computing device receives a dialog structure comprising a plurality of dialog nodes. The computing device determines a node emotion level for each of the dialog nodes in the dialog structure based on analysis of one or more intents of each of the dialog nodes in the dialog structure. The computing device determines emotional hotspot nodes in the dialog structure, the node emotion level for each of the emotional hotspot nodes exceeding an emotional threshold. The computing device generates one or more responses modifying the node emotion level of each of the emotional hotspot nodes.

20 Claims, 11 Drawing Sheets

(56) References Cited

U.S. PATENT DOCUMENTS

| | | |
|---|---|---|
| 2015/0178371 A1 | 6/2015 | Seth |
| 2016/0098992 A1* | 4/2016 | Renard .................. G10L 15/18 |
| | | 704/275 |
| 2016/0163332 A1 | 6/2016 | Un |
| 2016/0239774 A1 | 8/2016 | Babar |
| 2017/0324868 A1* | 11/2017 | Tamblyn ............. H04M 3/5191 |
| 2018/0053503 A1* | 2/2018 | Ogunyoku ............. H04W 4/90 |
| 2018/0144761 A1* | 5/2018 | Amini ..................... G10L 21/10 |

OTHER PUBLICATIONS

Grace Period Disclosure: Sandbank et al., "EHCTool: Managing Emotional Hotspots for Conversational Agents", IUI 2017 Companion • Mar. 13, 2017, Limassol, Cyprus, pp. 1-4.

Lisetti et al., "Why and How to Build Emotion-Based Agent Architectures", http://www.oxfordhandbooks.com/view/10.1093/oxfordhb/97801999422 . . . ,printed Jul. 3, 2017, pp. 1-3.

Mell et al., "The NIST Definition of Cloud Computing", National Institute of Standards and Technology, Special Publication 800-145, Sep. 2011, pp. 1-7.

Ochs et al., "A Formal Model of Emotions for an Empathic Rational Dialog Agent", Auton Agent Multi-Agent Syst (2012) 24:410-440, Springer, pp. 410-440.

Parthasarathy et al., "Defining Emotionally Salient Regions using Qualitative Agreement Method", http://ecs.utdallas.edu/research/researchlabs/msp-lab/publications/Parthasarathy_2016.pdf, Sep. 12, 2016, pp. 1-25.

Wrede et al., "The Relationship Between Dialogue Acts and Hot Spots in Meetings", http://ieeexplore.ieee.org/stamp/ stamp.jsp?amumber=1318425, 2003 IEEE, pp. 180-185.

\* cited by examiner

US 10,733,384 B2

EMOTION DETECTION AND EXPRESSION INTEGRATION IN DIALOG SYSTEMS

Aspects of the present invention may have been disclosed by the inventors in the article, "EHCTool: Managing Emotional Hotspots for Conversation Agents," made available to the public on or after Mar. 13, 2017 at the 22$^{nd}$ Annual Meeting of the Intelligent User Interfaces Community. These aspects, as they may appear in the claims, may be subject to consideration under 35 U.S.C. § 102(b)(1)(A).

BACKGROUND

The present invention relates generally to dialog systems, and more particularly to emotional detection in dialog systems.

BRIEF SUMMARY

Embodiments of the present invention disclose a method, system, and computer program product for utilizing a computing device to detect and respond to emotion in dialog systems. The computing device receives a dialog structure, the dialog structure comprising a plurality of dialog nodes. The computing device determines a node emotion level for each of the dialog nodes in the dialog structure based on analysis of one or more intents of each of the dialog nodes in the dialog structure. The computing device then determines emotional hotspot nodes in the dialog structure, the node emotion level for each of the emotional hotspot nodes exceeding an emotional threshold. The computing device generates one or more responses modifying the node emotion level of each of the emotional hotspot nodes.

DETAILED DESCRIPTION

Dialog systems providing logic guiding automated conversation agents including chatbots, telephone-based system, "talking heads," or other automated means of holding a text or speech conversation are increasingly used to initiate and hold conversations with human dialog users in an automated fashion. Dialog systems receive natural language input from the dialog users, and, in combination with machine learning to continuously improve, simulate a conversation between humans. At present, dialog systems perform various functions for dialog users including making reservations, providing technical support, answering consumer questions, giving product information, and providing website navigation in applications including websites, telephone directories, telephone call centers, and others. Dialog systems, in combination with the automated conversation agents guided by the dialog systems, serve to reduce frustration in answering simple questions by human agents, who would hold the conversation in place of the automated conversation agents, and the number of repetitive questions human agents have to answer in these situations.

Design of dialog systems, however is a complex and tedious process, further complicated by insufficient means of detecting and responding to emotions the human dialog user may express during the conversation. Emotions experienced by the dialog user (such as anger, confusion, or frustration) may make the dialog user difficult to comprehend, illogical, and/or not responsive. Current emotional analysis application-programming interfaces leave no control to the dialog designer, and are prone to leaving a dialog user holding a conversation with a conversation agent frustrated, angry, confused, or experiencing other negative emotions. Presented are a method, a system, and a computer program product for detecting and responding to emotion in dialog systems.

Figure 1:
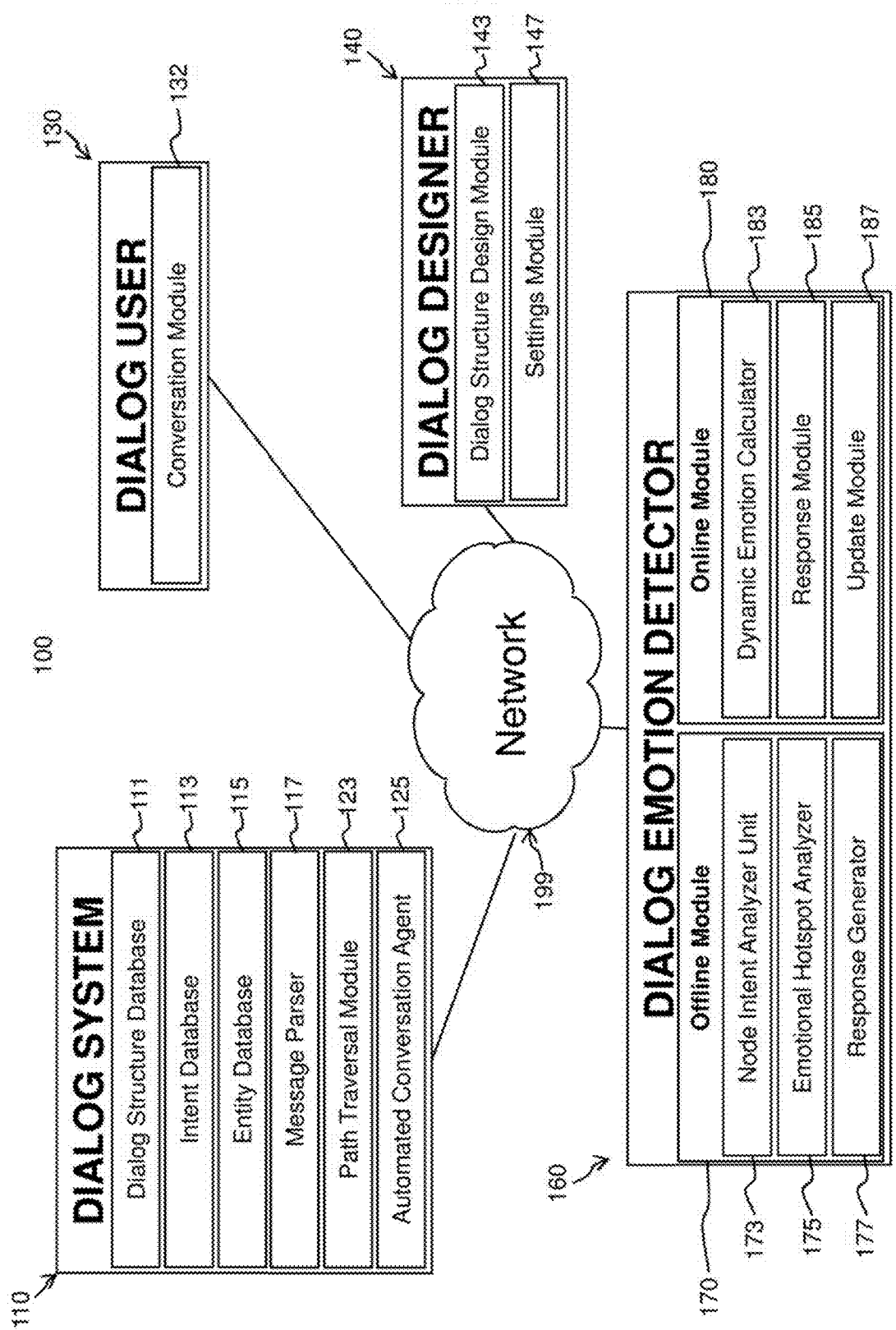
FIG. 1 is a functional block diagram illustrating an environment for emotional detection in dialog systems, in accordance with an embodiment of the present invention.

FIG. 1 is a functional block diagram illustrating an environment 100 for detecting and responding to emotion in dialog systems, in accordance with an embodiment of the present invention. In an exemplary embodiment, a dialog system 110 maintains a dialog structure which is utilized to hold a real-time dialog between an automated conversation agent associated with the dialog system 110 and a dialog user 130. The dialog structure is a series of nodes in the form of a logical tree, with each node containing intents and entities to be utilized by the automated conversation agent to first initiate a real-time dialog between the dialog system 110 and dialog user 130, interpret and respond to statements and/or requests from the dialog user 130 during the real-time dialog, generate responses to the statements and requests from the dialog user 130, interpret further statements and/or requests from the dialog user 130, generate and transmit further responses to the dialog user 130, etc. As the real-time dialog progresses, the dialog system 110 performs a path traversal though the dialog nodes of the dialog structure, with each node providing intents and entities utilized by the automated conversation agent in holding the real-time dialog with the dialog user 130 in various ways, as discussed.

The dialog structure utilized by the dialog system 110 is designed by a dialog designer 140 during an off-line stage (at some point in time before the dialog structure is utilized online during a real-time dialog). In an embodiment of the invention, a dialog emotion detector 160 is utilized during the off-line stage, to determine "emotional hotspots" in the dialog structure. Emotional hotspots are nodes in the dialog structure more likely to cause emotional responses in the dialog user 130, such as, for example, anger, frustration, or confusion during the real-time dialog. Knowledge of emotional hotspots is useful for dialog designer 140 to better control or avoid emotional experiences experienced by dialog users 130 which may occur at different times during the real-time dialog represented by the various nodes in the dialog structure. The dialog emotion detector 160 is also utilized, in a further embodiment of the invention, during an online stage to determine in real-time whether sequential nodes in a path traversal through the dialog structure during a real-time dialog performed by the dialog system 110 are having a cumulative effect in causing an emotional response during a real-time dialog with the dialog user 130. If so, dialog emotion detector 160 serves to minimize or alter the emotional response to best serve the needs of the dialog user 130.

In various embodiments, network 199 represents, for example, an internet, a local area network (LAN), a wide area network (WAN) such as the Internet, and may be any combination of connections and protocols that will support communications between the dialog system 110, dialog user 130, dialog designer 140, and dialog emotion detector 160, in accordance with an embodiment of the invention.

In various embodiments, dialog system 110, dialog user 130, dialog designer 140, and dialog emotion detector 160 may be, for example, a mainframe or a mini computer, a terminal, a laptop, a tablet, a netbook personal computer (PC), a mobile device, a desktop computer, or any other sort of computing device, in accordance with embodiments described herein. Dialog system 110, dialog user 130, dialog designer 140, and dialog emotion detector 160 may include internal and external hardware components as depicted and described further in detail with reference to FIG. 4, below. In other embodiments, each of dialog system 110, dialog user 130, dialog designer 140, and dialog emotion detector 160 may be implemented in a cloud computing environment, as described in relation to FIGS. 5 and 6, below. In a still further embodiment, some or all of dialog system 110, dialog user 130, dialog designer 140, and dialog emotion detector 160 are embodied in physically the same computing device, with all communications between various components made internally. In further alternate embodiments, dialog user 130 may be any electronic device allowing recording and playing-back of audio, video, including telephones, facsimile machines, teletype machines, video cameras, televisions and video equipment and the equivalents.

Dialog system 110, dialog user 130, dialog designer 140, and dialog emotion detector 160, in effect, represent any sort of computing device possessing sufficient processing power to execute software to be utilized in the environment for emotional detection in dialog systems 100, in accordance with an embodiment of the invention. Computing devices associated with some or all of dialog system 110, dialog user 130, dialog designer 140, and dialog emotion detector 160 may utilize a hosted workload 96, as displayed in connection with FIG. 5 below, and/or perform other tasks as further described herein.

In the exemplary embodiment, dialog system 110 includes a dialog structure database 111, an intent database 113, an entity database 115, a message parser 117, a path traversal module 123, and an automated conversation agent 125.

Dialog structure database 111 represents software and/or hardware for storing of a dialog structure for use in connection with the presently disclosed invention. The dialog structure is a series of nodes maintained in a logical tree structure, utilizing, for example, a linked-list, a doubly-linked list, an array, a vector, or any other data structure. Each node includes intents and/or entities for performing various functionality in connection with the presently disclosed invention. A dialog designer 140 designs the dialog structure such as with a specialized software tool, a development environment, or with any other currently existing or after-arising equivalent. The dialog structure is utilized in a real-time dialog between the dialog system 110 and the dialog user 130, as further discussed.

Intent database 113 represents software and/or hardware for storing a plurality of intents utilized in connection with the presently disclosed invention. Intents, in connection with the presently disclosed invention, are purposes or goals expressed in statements or requests contained in nodes received from a dialog user 130 by the dialog system 110. Intents are extracted by the dialog system 110 utilizing a parser with natural language understanding software from statements or requests received from the dialog user 130 during the real-time dialog. Intents expressed by the dialog user 130 are utilized by the path traversal module 123 in determining a correct path traversal through the dialog structure to best respond to the requests and statements by the dialog user 130. Intents may be pre-generated and utilized by the dialog designer 140 when designing the dialog structure, pre-generated but added to or modified by the dialog designer 140, or custom designed by the dialog designer 140. Intents may be accessed by, for example, with commands such as # weather_conditions, # make_reservation, # product_information. Each intent of the dialog nodes is designed to capture input from the dialog user 130 using natural language understanding. Each intent is associated with one or more natural language statements which may be parsed from real-time dialog with the dialog user 130 to indicate the intent is being accessed, as these natural language statements are parsed from the real-time dialog with the dialog user 130. For example, the intent # Payment-Make a Payment may be parsed with natural language statements from dialog user 130 such as, "I need to pay my bill," "Pay my account balance," or "Make a payment." Natural language processing software utilized in connection with presently disclosed invention may recognize similar statements such as "I want to make a payment" or "Make Payment" to parse intent # Payment-Make_a_Payment.

In the context of the presently disclosed invention, certain intents may be more likely to cause the emotion of anger to be expressed by the dialog user 130. These may include, for example, # Payment-Make_a_Payment, # Payment-Method_of_Payment_Update, # Payment-Method_of_Payment_Inquiry, and # Payment-Misc. Certain intents may be associated with high frustration by the dialog user 130, such as, for example, # Account_Management-Email_Change, # Account_Self_Service-Misc, # Network_Management-Misc, # Account_Management-Update_Change_Contact_Phone_Number. Certain intents may be associated with high confusion by the dialog user 130 such as, for example, # Help-Help Information-Porting_Inquiry, # Information-Store_Hours, # Service_Management-Change_Mobile_Phone_Number, and # Billing-Misc. These examples of intents causing anger, frustration, or confusion are included by non-limiting example only. Other intents causing other emotional responses are specifically contemplated in the presently disclosed invention.

Entity database 115 represents software and/or hardware for storing a plurality of entities. Entities may be understood in connection with the presently disclosed invention to be a class of objects or data types that are relevant to a purpose of the dialog user 130 participating in the real-time dialog. Entities are recognized in the presently disclosed invention by the dialog system 110, and parsed from statements and requests from dialog users 130. Entities are utilized by the dialog system in determining which specific action to take in responding to the statement or request from the dialog user 130.

Message parser 117 represents software for parsing statements or requests from dialog user 130 during a real-time dialog between the dialog user 130 and the dialog system 110. Software utilized by the message parser 117 includes natural language understanding software as well as machine learning tools to continue to improve the parsing performed by the message parser 117. Statements and requests parsed from dialog user 130 are compared against intents and/or entities at each node in the real-time dialog structure to determine how to respond to the dialog user 130, and how to advance the real-time dialog to a next node in the dialog structure for further continuation of the real-time dialog.

Path traversal module 123 represents software for determining which nodes to utilize in a path traversal through the nodes available in the dialog structure during a real-time dialog. In various embodiments of the invention, after a dialog user 130 accesses the dialog system 110 to begin the real-time dialog, the path traversal begins at a root in the dialog structure, or the initial node in the path traversal where a greeting is issued to the dialog user 130, along with an initial request for purpose of the dialog user 130 in accessing the dialog system 110. After message parser 117 parses the response or requests from the dialog user 130 (utilizing intents and/or entities associated with the initial node), path traversal module 123 relies upon internal logic within the dialog structure database 111 to determine which node to proceed to, of the children nodes in the dialog structure sharing an edge with the initial node. As dialog system 110 continues the real-time dialog with the dialog user 130, path traversal module 123 continues to determine which node in the path traversal to continue to next, and at that next node, after further parsing based upon intents and/or entities available at that node and generation of further response and/or statements, continues this process until the real-time dialog concludes.

Automated conversation agent 125 represents software and/or hardware for receiving from dialog user 130 natural language statements and/or requests and transmitting responses and/or statements to the dialog user 130, also in natural language during real-time dialog. Automated conversation agent 125 receives natural language from the dialog user 130 in the form of audio, video, or text, in various embodiments of the invention. Natural language received by the automated conversation agent 125 may include audio, video, or text, as further discussed herein. Automated conversation agent 125 may convert audio or video received from dialog user 130 to text for further processing herein. Responses and/or statements are also transmitted by automated conversation agent 125 to the dialog user 130 for playing back (in the case of telephone, audio, or video natural language), or transmits text for display, such as in connection with a chatbot.

In the exemplary embodiment, dialog user 130 includes a conversation module 132.

Conversation module 132 represents software and/or hardware by which dialog user 130 receives natural language audio, video, or text messages from the automated conversation agent 125 of the dialog system 110, and displays (or plays back) the text, audio, or video to a user at dialog user 130 device during the real-time dialog. Conversation module 132 also serves to transmit natural language to the dialog system 110 for further use, as discussed herein, in holding a real-time dialog. The conversation module 132 may be, for example in various embodiments of the invention, an internet browser, a dedicated application executing on the dialog user 130 device, video recording and playback hardware and software, an audio recording and playback device (such as a telephone), or any currently-existing or after-arising equivalents. If the natural language received from the dialog system 110 and transmitted from the dialog user 130 is in the form of text messages, the real-time dialog may appear as a series of text messages in an instant messenger executing within the internet browser or as the dedicated application, with the most recent text message from the dialog system 110 or dialog user 130 appearing at the bottom of the instant messenger. As displayed in connection with FIG. 4, dialog user 130 may utilize a keyboard 922, pointing device 924 in entering natural language into conversation module 132 for transmission by the conversation module 132 to the dialog system 110, and display screen 920 (such as displayed in FIG. 4) displays the real-time text dialog.

If the natural language received from the dialog system 110 is in the form of video, conversation module 132 may be a display screen (such as displayed 920 in FIG. 4) utilized in conjunction with a video recording device or microphone, with internet browser or a dedicated application supporting both. If the natural language received from the dialog system 110 is in the form of audio, conversation module 132 may be computer speakers and a microphone with internet browser or a dedicated application supporting both, or a telephone receiver and transmitter, where all software functionality is performed at dialog system 110. Equivalents are specifically contemplated herein. In various alternate embodiments of the invention, the automated conversation agent 125 may be a telephone based system with a speech-to-text and text-to-speech engine, "talking head," robot, gesture interpreter, computer audio-based system, etc.

In the exemplary embodiment, dialog designer 140 includes dialog structure design module 143 and settings module 147.

Dialog structure design module 143 represents software for dialog designer 140 to design a dialog structure for utilization in connection with the presently disclosed invention. Dialog structure design module 143 may be a specialized application, an internet browser, web design software, an integrated development environment, or otherwise. Dialog designer 140 may design each individual node in the dialog structure, including for each individual node intents and entities for providing within the individual node, responses for responding to dialog user 130, as well as logic for traversing from one node to another node in the dialog structure. Dialog designer 140 may also utilize a specialized library of pre-made nodes and utilize one or more as maintained in the specialized library, or utilize one with modifications made to the logic, intents, responses, entities, etc. made by the dialog designer 140. In an embodiment of the invention, some or all responses utilized by nodes within the dialog structure (such as emotional hotspot nodes) are generated by the presently disclosed invention and transmitted to the dialog designer 140 for approval (such as via a pop-up window in a graphic user interface), as further discussed herein. If dialog designer 140 rejects all or some of the responses generated by the presently disclosed invention, dialog designer 140 may add a dialog designer response created by the dialog designer 140.

Settings module 147 represents software for dialog designer 140 to adjust a variety of settings which may be utilized in connection with the presently disclosed invention. Settings module includes settings to:

Establish and adjust an emotional threshold t, beyond which a node in the dialog structure may be marked an "emotional hotspot node," (emotional threshold t is also utilized, in other embodiments, as a threshold to determine whether a response, reply, or statement is presented to the dialog user 130, if the node emotion level exceeds t);

Establish a maximum number of nodes K which may be considered emotional hotspot nodes, each of the K nodes having the highest node emotion level $n_i$ of all those in the dialog structure;

Adjust a window size variable s of a number of nodes in a path traversal through the dialog structure accounted for by the online emotional rating algorithm;

Establish and adjust a variable representing a maximum number of responses, replies, or statements k transmitted by the dialog system 110 to dialog user 130 during real-time dialog;

Establish and adjust an update threshold variable indicating when update module 187 updates the zero or more emotional hotspot nodes In the exemplary embodiment, dialog emotion detector 160 includes an offline module 170 for use by dialog designer 140 before the presently disclosed invention is made available to dialog user, and an online module 180 for utilization while holding a real-time dialog with dialog user 130.

In the exemplary embodiment, offline module 170 of dialog emotion detector 160 includes a node intent analyzer unit 173, an emotional hotspot analyzer 175, and a response generator 177.

Node intent analyzer unit 173 represents software and/or hardware for analyzing one or more intents of dialog nodes in a dialog structure. The dialog structure is received by the node intent analyzer unit 173 for analysis. Node intent analyzer unit 173 proceeds to analyze one or more intents within each of the dialog nodes in the dialog structure (or, in other embodiments, analyzes intents and/or entities) to determine a node emotion level $n_i$ for the node. The node emotion level $n_i$ is the emotion level the dialog node is likely to cause when replying or responding to the dialog user 130. The node emotion level $n_i$ is utilized by the presently disclosed invention as further discussed herein. In an embodiment of the invention, the node emotion level $n_i$ is calculated according to formula where $n_i$, as discussed previously, is the node emotion level, d is a depth of the node in the dialog structure, f(d) is some function (such as $$f(d) = \frac{1}{d}),$$

and $w_i$ is an unadjusted emotion level for node i.

In an embodiment of the invention, in generating the node emotion level $n_i$, node intent analyzer unit 173 analyzes each sentence of intent for each dialog node with an intent-emotions probability vector, then averages analyzed vectors for all sentences, and utilizes the average of emotions vectors for determination of node emotion level $n_i$. For example, one sentence may cause "disgust" with a likelihood of 0.086905, the next sentence may cause "confusion" with a likelihood of 0.155024, the next sentence may cause "sadness" with a likelihood of 0.070522, the next sentence may cause "boredom" with a likelihood of 0.080958, the next sentence may cause "frustration" with a likelihood of 0.315989, the next sentence "anger" with a likelihood of 0.104079, the next sentence "surprise" with a likelihood of 0.067356, the next sentence "fear" with a likelihood of 0.070816, and the final sentence "happiness" with a likelihood of 0.0484451. The node intent analyzer unit 173 may average all these likelihoods to generate an average of all emotion vectors for the node, for further use as discussed in determining the node emotion level $n_i$. In an embodiment of the invention, node emotional level for nodes relying upon AND logic may be calculated by formula $$\frac{a_1}{a_1 + a_2} * \vec{V}_1 + \frac{a_2}{a_1 + a_2} * \vec{V}_2,$$

and for nodes relying upon OR logic, node emotion level may be calculated by formula $$P_1 * \frac{a_1}{a_1 + a_2} * \vec{V}_1 + P_2 * \frac{a_2}{a_1 + a_2} * \vec{V}_2, P_1 + P_2 = 1.$$

Emotional hotspot analyzer 175 represents software and/or hardware for determining emotional hotspot nodes in the dialog structure received by the dialog system 110. In determining whether any node is an emotional hotspot node, the emotional hotspot analyzer 175 may determine whether the node emotion level $n_i$ exceeds emotional threshold t. In an embodiment of the invention, the dialog designer 140 establishes emotional threshold t with settings module 147. In an embodiment of the invention, emotional hotspot analyzer 175 only selects top-K (or fewer than K) nodes that have the highest detected node emotional level in determining all emotional hotspot nodes. K may also be established by the dialog designer 140 with settings module 147.

Response generator 177 represents software and/or hardware for generation or alteration of responses, statements, and/or replies modifying the node emotion level for some or all of the emotional hotspot nodes. In an embodiment of the invention, after determining the node emotion level for any given node in the dialog structure, response generator 177 determines whether the node emotional level indicates the dialog user 130 is experiencing negative emotions, positive emotions, or neutral emotions. If the dialog user 130 is experiencing negative emotions during the real-time dialog, and is, for example, frustrated, confused, or angry, the response generator 177 may generate or alter a response, statement, and/or reply stored in some or all of the hotspot nodes to generate an apologetic or empathic response. If dialog user 130 is experiencing positive emotions during the real-time dialog and is, for example, happy, hopeful, or grateful, the response generator 177 may generate or a cheerful response. If dialog user 130 is experiencing neutral emotions during the real-time dialog, response generator 177 may not generate or alter a response and/or reply at all. Response generator 177 may limit a number of responses, statements, and/or replies transmitted to dialog user 130 to a number of nodes in a path traversal through the dialog structure during the real-time dialog. In a further embodiment of the invention, response generator 177 generates or modifies responses, statements, and/or replies by altering timing of the responses and/or replies to respond early to potential emotionally sensitive issues, but not respond and/or reply twice in a row during the real-time dialog. After generation or alteration of responses, statements, and/or replies, modifying the node emotion level of each of the one or more emotional hotspots, the responses, statements, and/or replies are transmitted to dialog structure design module 143 for approval.

In the exemplary embodiment, online module 180 of dialog emotion detector 160 includes dynamic emotion calculator 183, response module 185, and update module 187. Online module 180 serves to determine when to present generated or modified responses, statements, and/or replies to dialog user 130 to modify an emotion level a human at dialog user 130 devices is experiencing when holding a real-time dialog with dialog system 110.

Dynamic emotion calculator 183 includes software and/or hardware for calculating in real-time a cumulative effect on emotional response sequential nodes are having during a path traversal through the dialog structure during a real-time dialog. Dynamic emotion calculator 183 serves to minimize or alter the emotional response to best serve the needs of the dialog user 130. Dynamic emotion calculator 183 receives a path traversal through the dialog structure, the path traversal representing a real-time dialog between automated conversation agent 125 of dialog system and dialog user 130.

Dynamic emotion calculator 183 then utilizes an online emotional rating algorithm to determine adjusted current emotion levels for each node in the path traversal. In an embodiment of the invention, the adjusted current emotion level for each node in the path traversal is adjusted for one or more previous nodes in the path traversal (or each previous node in the path traversal). In effect, if an early node in the path traversal causes anger, a later node in the same path traversal is much more likely to also cause anger, even if the node itself is only slightly irritating. In an embodiment of the invention, a window size variable s is utilized to determine the number of previous nodes in the path traversal accounted for by the online rating algorithm. Window size variable s is pre-configured, or adjusted by dialog designer 140 utilizing settings module 147.

Response module 185 represents hardware and/or software to present previously generated or modified responses, replies, or statements to dialog user 130 to modify emotion levels of the nodes during real-time dialog. Response module 185 first determines whether the node in the path traversal was previously determined by the emotional hotspot analyzer 175 to be one of the emotional hotspot nodes, and whether the dialog designer 140 previously approved the response, reply, or statement generated or modified by the response generator 177 to modify the node emotional level. In various embodiments of the invention, response module 185 presents one or more responses, replies, or statements to the dialog user 130 to modify the node emotion level during real-time dialog. Response module 185 may not send a response to the dialog use 130, however, if a response was also transmitted to the dialog user 130 in an immediately preceding node in the path traversal.

In a further embodiment of the invention, response module 185 also maintains a computerized variable representing a number of responses, statements, and/or replies presented by the dialog system 110 to the dialog user 130 during a pending real-time dialog. In this embodiment, previous to presenting the response, reply, or statement the response module 185 determines whether the variable representing the maximum number of responses, statements, and/or replies k transmitted by the dialog system 110 to the dialog user 130 was reached, and only replies if the computerized variable representing the number of responses, statements, and/or replies is less than the variable representing the maximum number of response, replies, and/or statements k.

Update module 187 represents hardware and/or software to continue to update analysis performed by the offline module 170 and continue to perform other functionality the online module 180 is responsible for, in an embodiment of the invention. In various embodiments of the invention, intents, entities, logic, responses, replies, and statements each node in the dialog structure is continuously updated by the dialog designer 140, making it necessary to update previous analyses of emotional hotspot nodes performed by the node intent analyzer unit 173, emotional hotspot analyzer 175, and response generator 177. In such circumstances, update module 187 updates an analysis of the one or more intents and/or entities of each of the dialog nodes in the dialog structure and updates a determination of the node emotion level for each of the dialog nodes based upon the updated analysis of the one or more intents and/or entities of each of the dialog nodes. Update module 187 updates a determination of which nodes in the dialog structure are emotional hotspot nodes. Update module 187 may update the determination of which nodes are emotional hotspot nodes when the updated node emotional level for each of the emotional hotspot nodes exceeds an update threshold, the update threshold preset or established by settings module 147. Update module 187, in response to updating the emotional hotspot nodes, generates one or more new responses, replies, and/or statements to modify the node emotion level of each of the one or more emotional hotspot nodes. The new responses, statements, and/or replies modifying the node emotion level generated by the update module 187 are then transmitted to the dialog designer 140 for approval.

Update module 187, in a further embodiment of the invention, continues to perform other functionality during a new real-time dialog. Update module 187 receives a new path traversal through the dialog structure. The new path traversal represents a new real-time dialog between dialog system 110 and dialog user 130. Update module 187 utilizes the online emotional rating algorithm to determine a new adjusted current emotion level for each node in the new path traversal, the new adjusted current emotion level adjusted for a new emotion level of previous nodes in the path traversal. Update module 187 determines whether the node in the path traversal was determined to be emotional hotspot nodes after updating, and whether the dialog designer 140 approved the new response, statement, and/or response, statement, and/or replies modifying the node emotion level. Update module 187 then presents one of the one or more new responses modifying the node emotion level when responding to the dialog user 130 in real-time.

FIGS. 2A, 2B, 2C, 2D, and 2E represent a path traversal through a dialog structure 200 utilizing an online module 180 to determine when to present generated or modified responses, statements, and/or replies to dialog user 130, in accordance with an embodiment of the invention. Dialog structure 200 is maintained by dialog structure database 111 of dialog system 110. Dialog structure 200 has five levels of depth d, level d1 210, level d2 220, level d 3 230, level d4 240, and level d5 250. Each of levels d2 210 through d5 250 have multiple nodes associated with them, as displayed in FIGS. 2A, 2B, 2C, 2D, and 2E. Various embodiments of the invention may have more or fewer levels of depth d. In this embodiment, window size variable s is established by the dialog designer 140 by the settings module 147 to be 4, therefore the online emotional rating algorithm utilized in FIG. 2A et seq. considers up to four nodes in a path traversal through dialog structure 200. In this embodiment the maximum number of responses k presented within a single window (or chat window utilizing the dialog structure 200, in this embodiment) is set by the dialog designer to be two. Emotional threshold t is established by the dialog designer 140 to be 0.75. In this embodiment, in order for a response to be presented, emotional threshold t must be exceed node emotion level $n_1$.

At level d1 210, path traversal begins at root of dialog structure 200 where initial node 1 (215) issues a greeting to dialog user 130. Dialog system 110 may request the purpose of the dialog user 130 in accessing the dialog system 110 at initial node 1 215. As the real-time dialog continues, and execution of online module 180 proceeds, actual emotion score $e_j$ is calculated for each node in the path traversal. In an embodiment of the invention, actual emotion score $e_j$ is calculated for the previous s/2 nodes in the path traversal including node i, where j∈{i−s/2, . . . , i}. Initial node 1 215 has actual emotion score $e_1$=0.2. From initial node 1 215 path traversal proceeds to level d2 220, where node 2 223 has an unadjusted emotion score $w_2$=0.7, node 8 225 has an unadjusted emotion score $w_8$=0.15, and node 12 227 has an unadjusted emotion score of $w_{12}$=0.5. Node emotion level $n_1$ for initial node 1 215 is calculated as follows:

$$n_1 = \alpha_1 \cdot e_1 + \beta_2 \cdot w_2 + \beta_8 \cdot w_8 + \beta_{12} \cdot w_{12} =$$
$$1 \cdot 0.2 + \frac{1}{3} \cdot 0.7 + \frac{1}{3} \cdot 0.15 + \frac{1}{3} \cdot 0.5 = 0.65$$

Figure 2A:
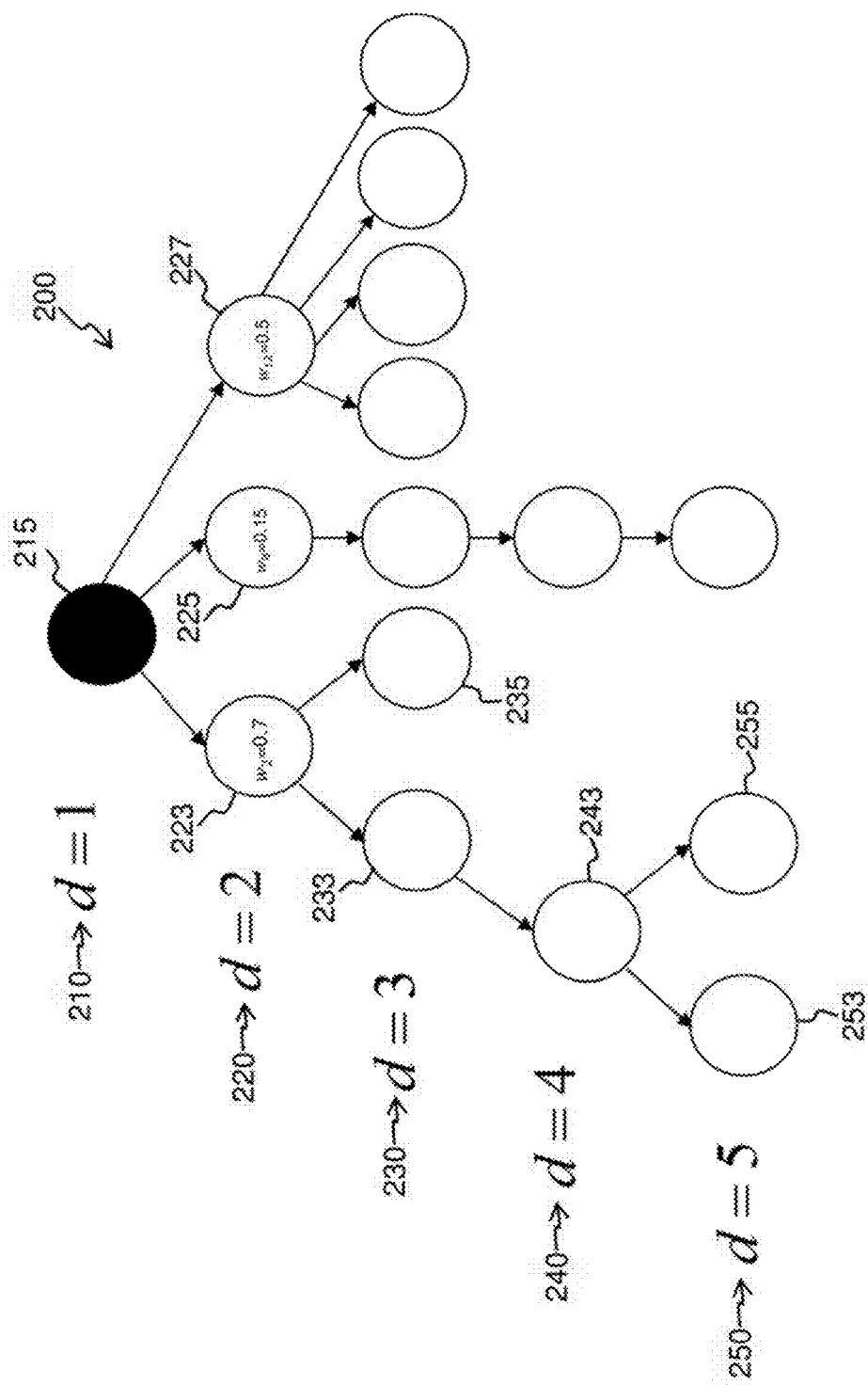
FIGS. 2A, 2B, 2C, 2D, and 2E represent a path traversal through a dialog structure utilizing an online module to determine when to present generated or modified responses, statements, and/or replies to dialog user, in accordance with an embodiment of the invention.
Figure 2B:
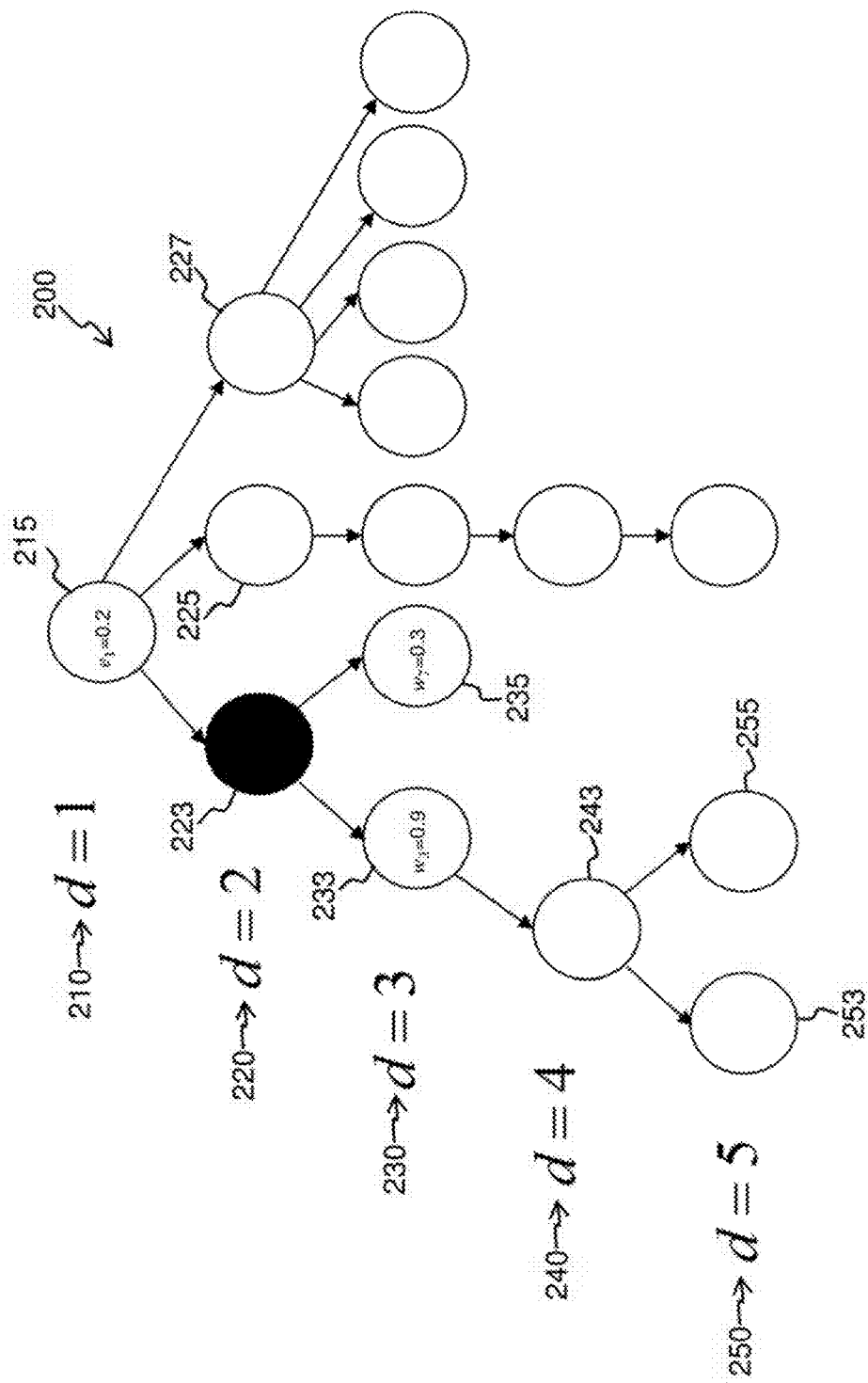

Note, j is the probability to reach a child node a parent node, and $\alpha_1$=1. Since $n_1$=0.65 is less than t=0.75, no response is transmitted to dialog user 130 at initial node 1 215. As shown in FIG. 2B, based upon logic associated with initial node 1 215, dialog user 130 input, etc. path traversal continues to node 2 223. From node 2 223, path traversal proceed to level d3 230, where node 3 233 has an unadjusted emotion score $w_3$=0.9, and node 7 235 has an unadjusted emotion score $w_7$=0.3. As calculated previously, node emotion level $n_1$ for initial node 1 215 was calculated to be 0.65. Node emotion level $n_2$ for node 2 223 is calculated as follows:

$$n_2 =$$
$$\alpha_1 \cdot e_1 + \alpha_2 \cdot e_2 + \beta_3 \cdot w_3 + \beta_7 \cdot w_7 = 1 \cdot 0.2 + 1 \cdot 0.3 + \frac{1}{2} \cdot 0.9 + \frac{1}{2} \cdot 0.3 = 1.1$$

Figure 2C:
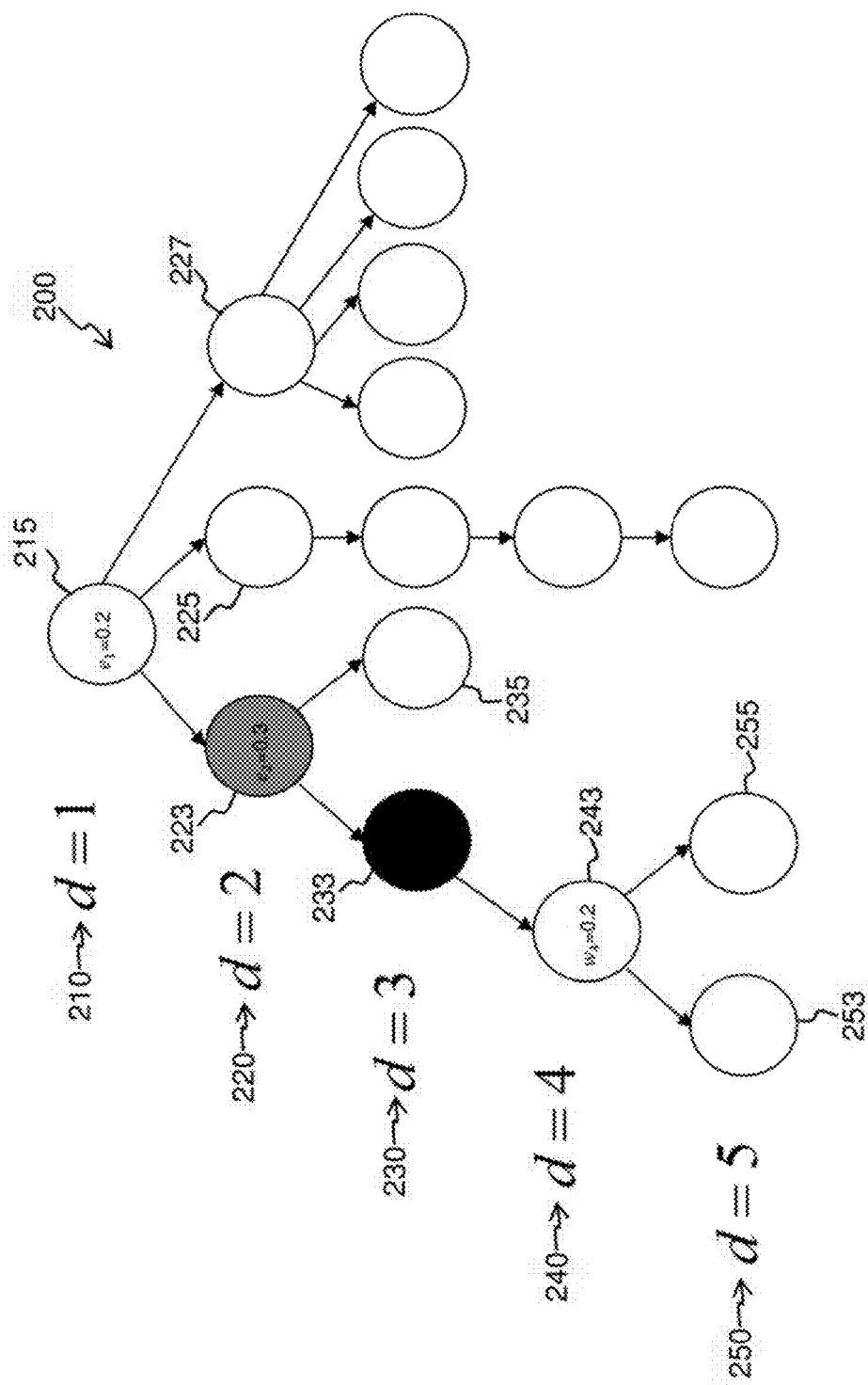

Since node emotion level $n_2$=1.1 is greater than t=0.75, and, in this embodiment, node 2 223 has previously been determined to be an emotional hotspot with the response approved by the dialog designer 140, one of the one or more responses is presented to dialog user 130 at node 2 223. As shown in FIG. 2C, based upon logic associated with node 2 223, dialog user 130 input, etc., path traversal continues to node 3 233. From node 3 233, path traversal proceeds to level d4 240, where node 4 243 has an unadjusted emotion score $w_4$=0.2. As calculated previously, node emotion level $n_1$ for initial node 1 215 was calculated to be 0.65, and node emotion level $n_2$ for node 2 223 was calculated to be 1.1. Node emotion level $n_3$ for node 3 233 is calculated as follows:

$$n_3 = \alpha_1 \cdot e_1 + \alpha_2 \cdot e_2 + \alpha_3 \cdot e_3 + \beta_4 \cdot w_4 = 1 \cdot 0.2 + 1 \cdot 0.3 + 1 \cdot 0.2 + 1 \cdot 0.2 = 0.9$$

Figure 2D:
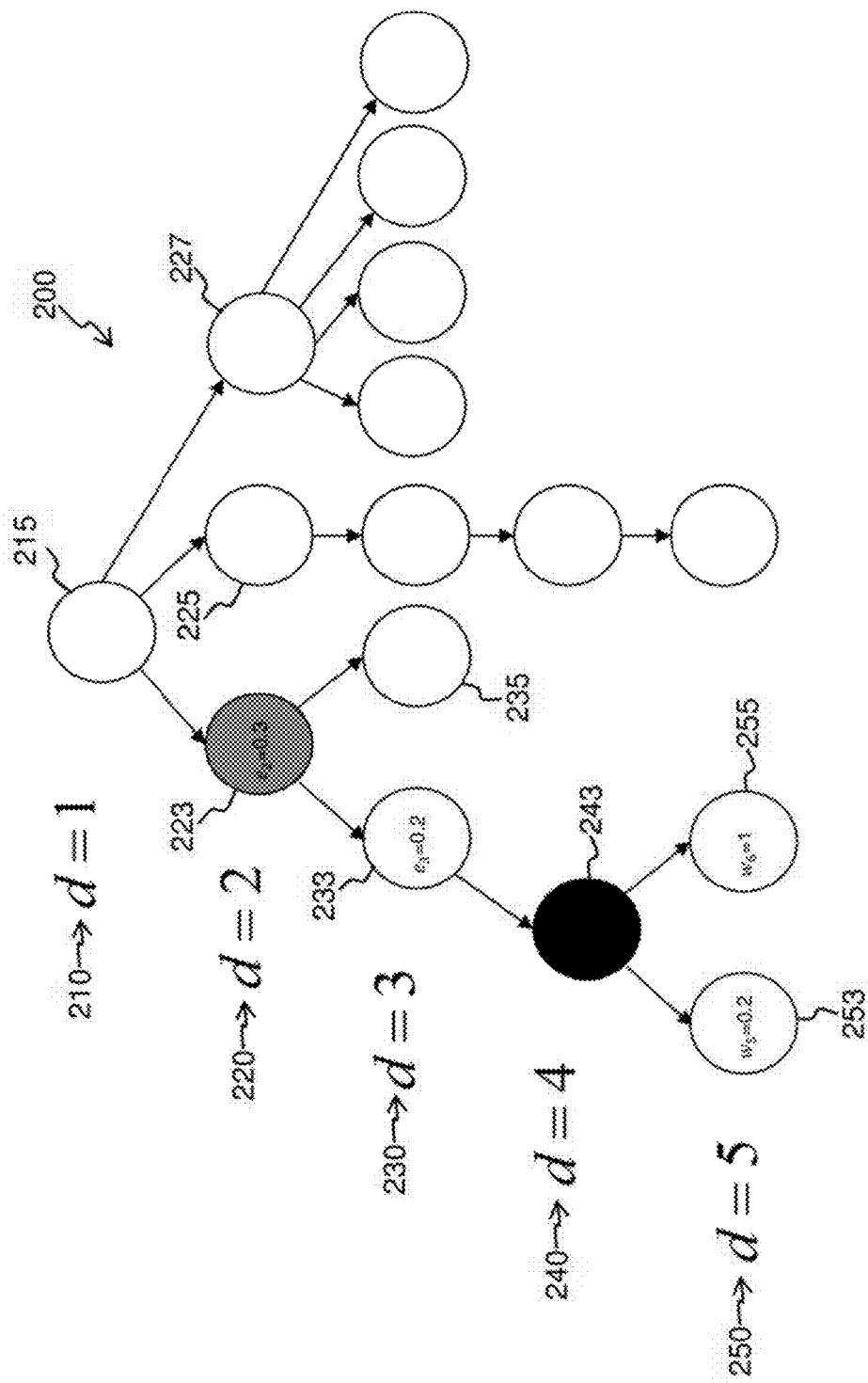

Node emotion level $n_3$=0.9 is greater than t=0.75, and, in this embodiment, node 3 233 was determined to be an emotional hotspot with the response approved by the dialog designer 140, but because a response was previously presented at node 2 223, no response is presented at node 2 233. As shown in FIG. 2D, based upon logic associated with node 3 233, dialog user 130 input, etc., path traversal continues to node 4 243. From node 4 243, path traversal proceeds to level d5 250, where node 5 253 has an unadjusted emotion score $w_5$=0.2 and node 6 255 has an unadjusted emotion score of $w_6$=1.0. As calculated previously, node emotion level $n_1$ for initial node 1 215 was calculated to be 0.65, node emotion level $n_2$ for node 2 223 was calculated to be 1.1, and node emotion level $n_3$ was calculated to be 0.9. Node emotion level $n_4$ for node 4 243 is calculated as follows:

$$n_4 = \alpha_2 \cdot e_2 + \alpha_3 \cdot e_3 + \alpha_4 \cdot e_4 + \beta_5 \cdot w_5 + \beta_6 \cdot w_6 =$$
$$1 \cdot 0.3 + 1 \cdot 0.2 + 1 \cdot 0.1 + \frac{1}{2} \cdot 0.2 + \frac{1}{2} \cdot 1 = 1.2$$

Figure 2E:
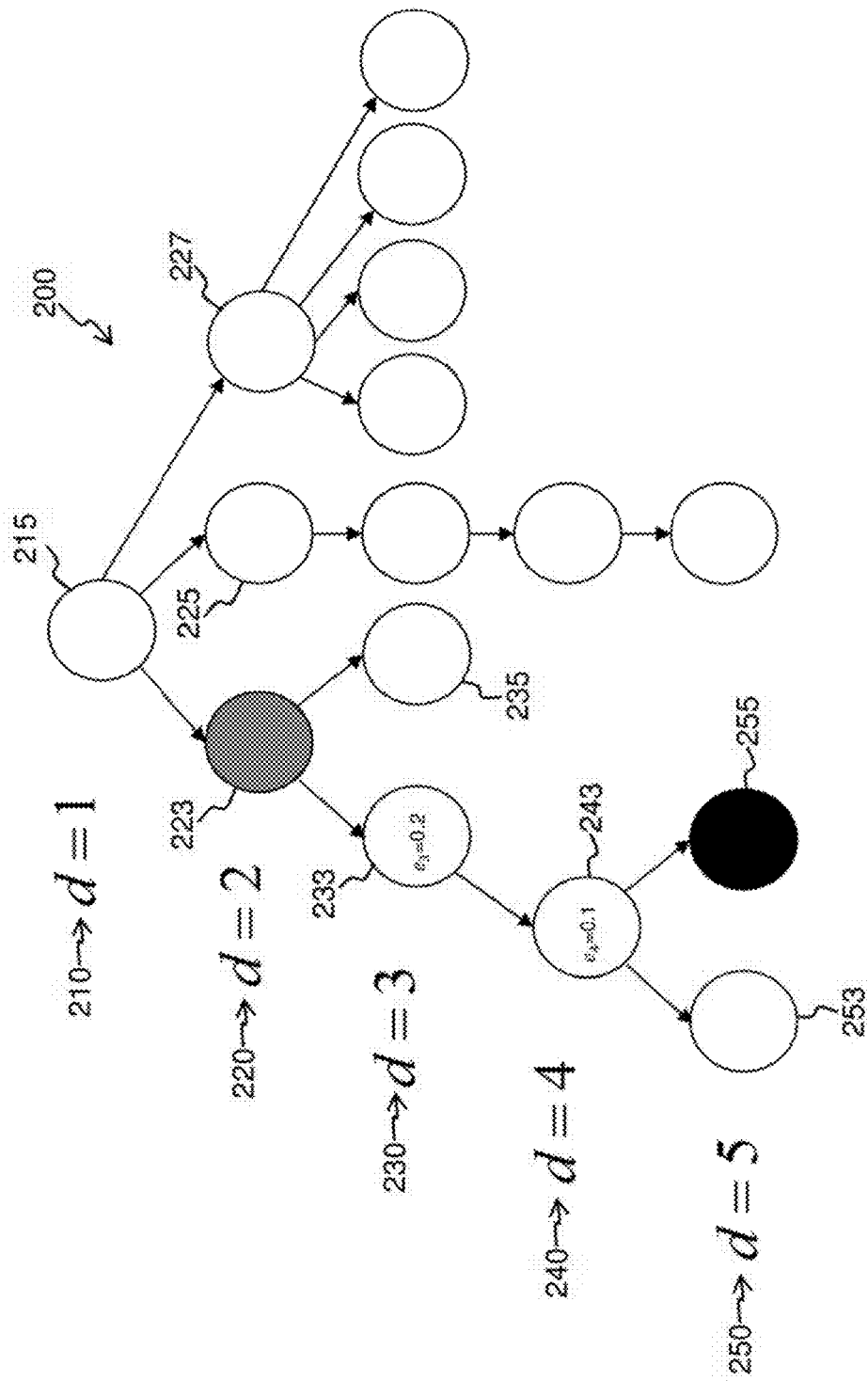

Node emotion level $n_4$=1.2 is greater than t=0.75, but, in this embodiment, node 4 243 was not marked as an emotional hotspot, so no response is presented to dialog user 130. As shown in FIG. 2E, based upon logic associated with node 4 243, dialog user 130 input, etc., path traversal continues to node 6 255, the end of dialog structure 200. As calculated previously, node emotion level emotion level $n_1$ for initial node 1 215 was calculated to be 0.65, node emotion level $n_2$ for node 2 223 was calculated to be 1.1, and node emotion level $n_4$ for node 4 243 was calculated to be 1.2. Node emotion level $n_6$ for node 6 255 is calculated as follows:

$$n_6 = \alpha_3 \cdot e_3 + \alpha_4 \cdot e_4 + \alpha_4 \cdot e_4 + \alpha_6 \cdot e_6 = 1 \cdot 0.2 + 1 \cdot 0.1 + 1 \cdot 0.5 = 0.8$$

Node emotion level $n_6$=0.8 is greater than t=0.77, and, in this embodiment, node 6 255 was marked as an emotional hotspot, and the response approved by dialog designer 140. Therefore, a response is transmitted to dialog user 130 one of the one or more responses is presented to dialog user 130 at node 2 223.

Figure 3A:
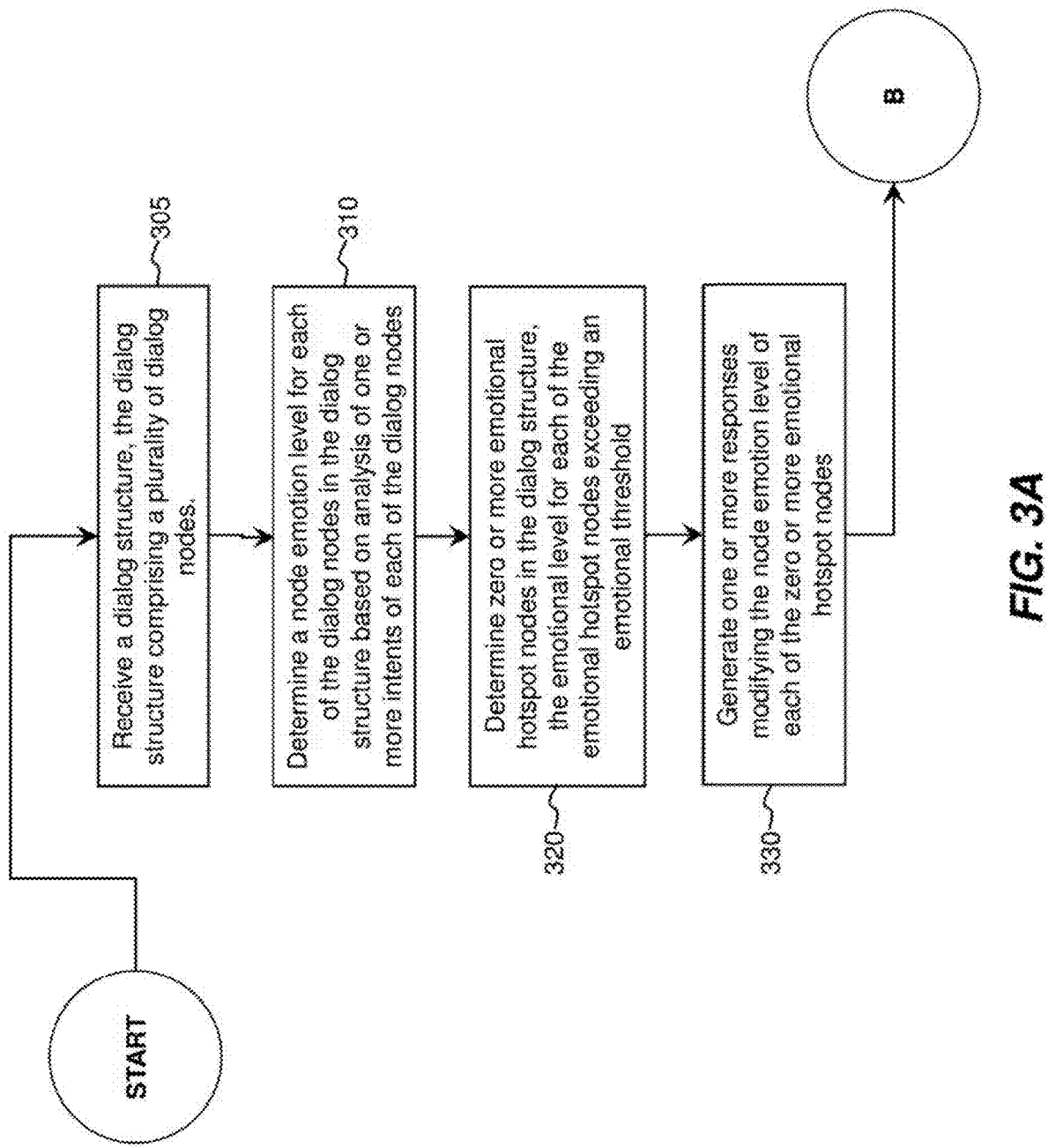
FIGS. 3A and 3B are a flowchart depicting operation steps that a hardware component, multiple hardware components, and/or a hardware appliance may execute, in accordance with an embodiment of the invention.
Figure 3B:
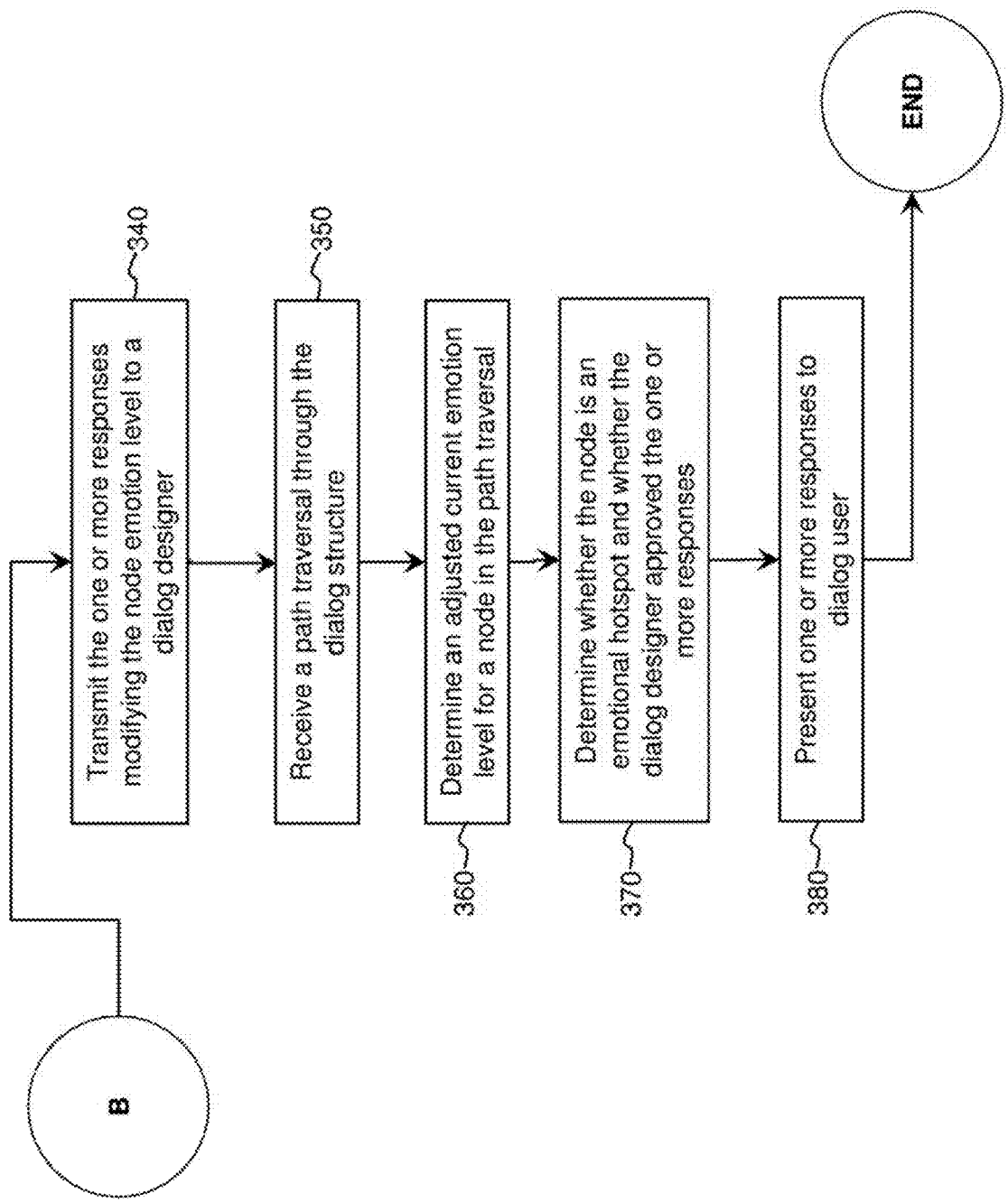

FIG. 3 is a flowchart depicting operational steps that a hardware component, multiple hardware components, and/or hardware appliance may execute, in accordance with an embodiment of the invention. At step 305, a dialog structure is received by offline module 170 of dialog emotion detector 160, the dialog structure comprising a plurality of dialog nodes. At step 310, node intent analyzer 173 determines a node emotion level for each of the dialog nodes in the dialog structure based on analysis of one or more intents of each of the dialog nodes in the dialog structure. At step 320, emotional hotspot analyzer 175 determines zero or more emotional hotspot nodes in the dialog structure, the node emotion level for each of the emotional hotspot nodes exceeding an emotional threshold established by the settings module 147. At step 330, response generator 177 generates one or more responses modifying the node emotion level of each of the zero or more emotional hotspot nodes. At step 340, the one or more responses are sent to dialog structure design module 143 for approval. At step 350, a path traversal through the dialog structure is received by online module 180, the path traversal representing a real-time dialog between automated conversation agent 125 of dialog system 110 and conversation module 132 of dialog user 130. At step 360, dynamic emotion calculator 183 utilizes an online emotional rating algorithm to determine an adjusted current emotion level for a node in the path traversal, the adjusted current emotion adjusted for an emotion level of previous nodes in the path traversal. At step 370, response module 185 determines whether the node in the path traversal was determines by the emotional hotspot analyzer 175 to be one of the emotional hotspot nodes, and whether dialog designer 140 approved the one or more responses modifying the emotion level. At step 380, response module 185 or automated conversation agent 125 presents one of the one or more responses when responding to the dialog user 130 during real-time dialog.

Figure 4:
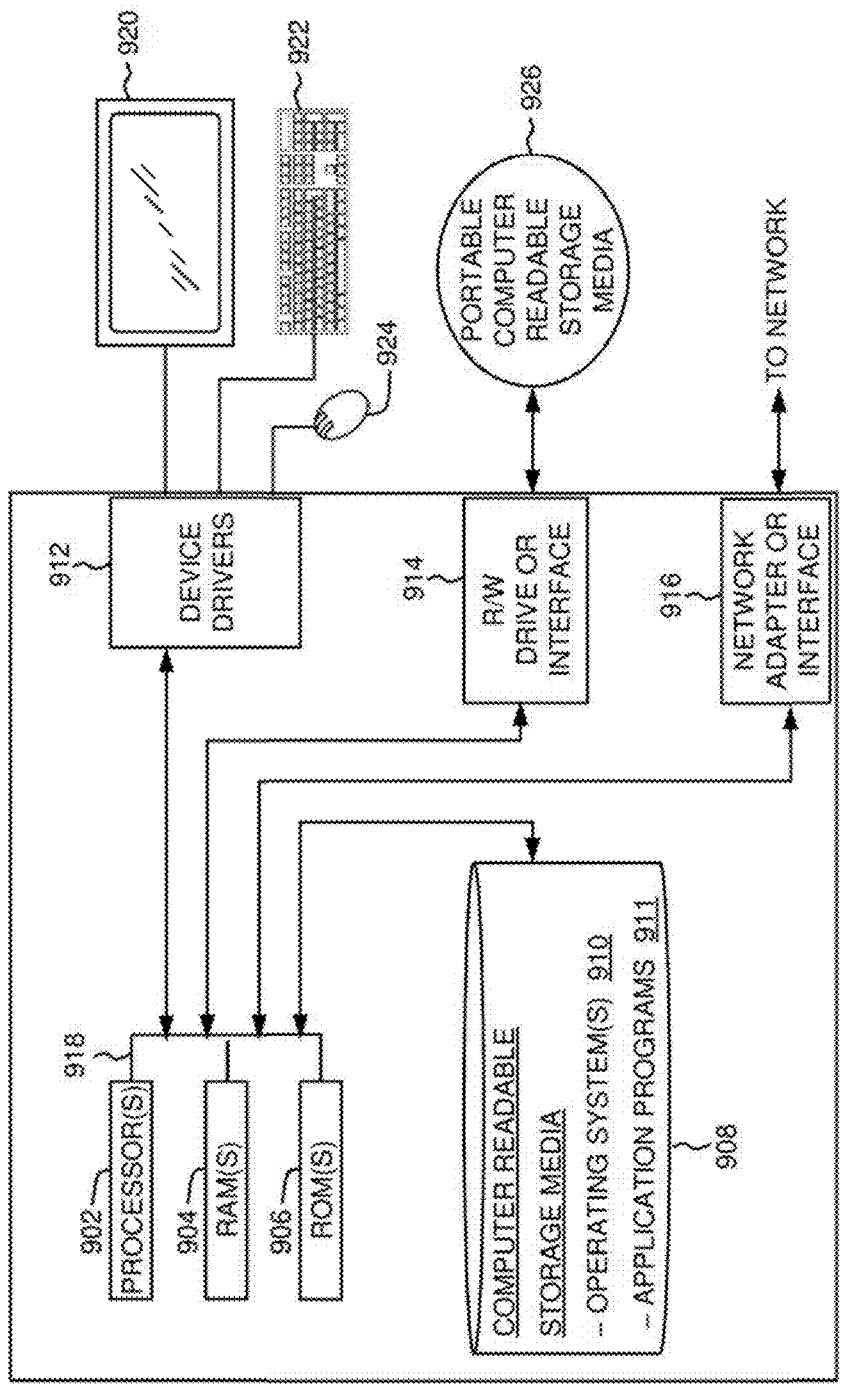
FIG. 4 depicts a block diagram of components of dialog system 110, dialog user 130, dialog designer 140, and dialog emotion detector 160 of FIG. 1, in accordance with an embodiment of the present invention.

FIG. 4 depicts a block diagram of components dialog system 110, dialog user 130, dialog designer 140, and dialog emotion detector 160 in the environment 100 for detecting and responding to emotion in dialog systems, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Dialog system 110, dialog user 130, dialog designer 140, and dialog emotion detector 160 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment 100 for detecting and responding to emotion in dialog systems, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Dialog system 110, dialog user 130, dialog designer 140, and dialog emotion detector 160 may also include a R/W drive or interface 914 to read from and write to one or more portable computer readable storage media 926. Application programs 911 on dialog system 110, dialog user 130, dialog designer 140, and dialog emotion detector 160 may be stored on one or more of the portable computer readable storage media 926, read via the respective R/W drive or interface 914 and loaded into the respective computer readable storage media 908.

Dialog system 110, dialog user 130, dialog designer 140, and dialog emotion detector 160 may also include a network adapter or interface 916, such as a TCP/IP adapter card or wireless communication adapter (such as a 4G wireless communication adapter using OFDMA technology). Application programs 911 on dialog system 110, dialog user 130, dialog designer 140, and dialog emotion detector 160 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Dialog system 110, dialog user 130, dialog designer 140, and dialog emotion detector 160 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
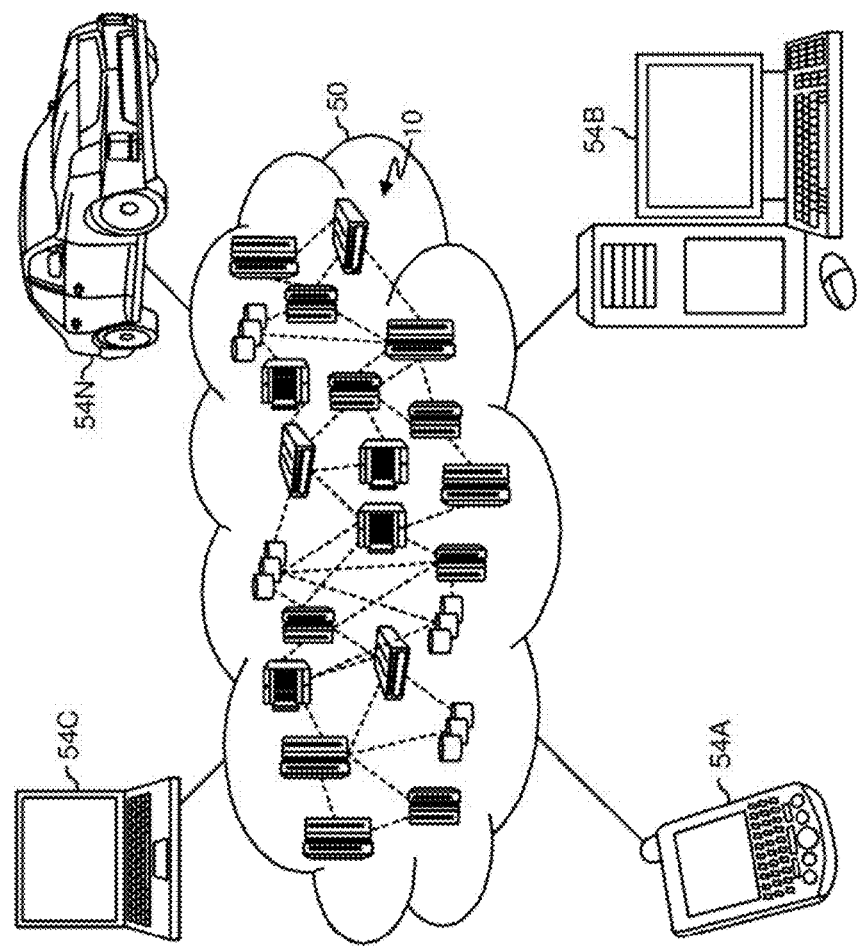
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
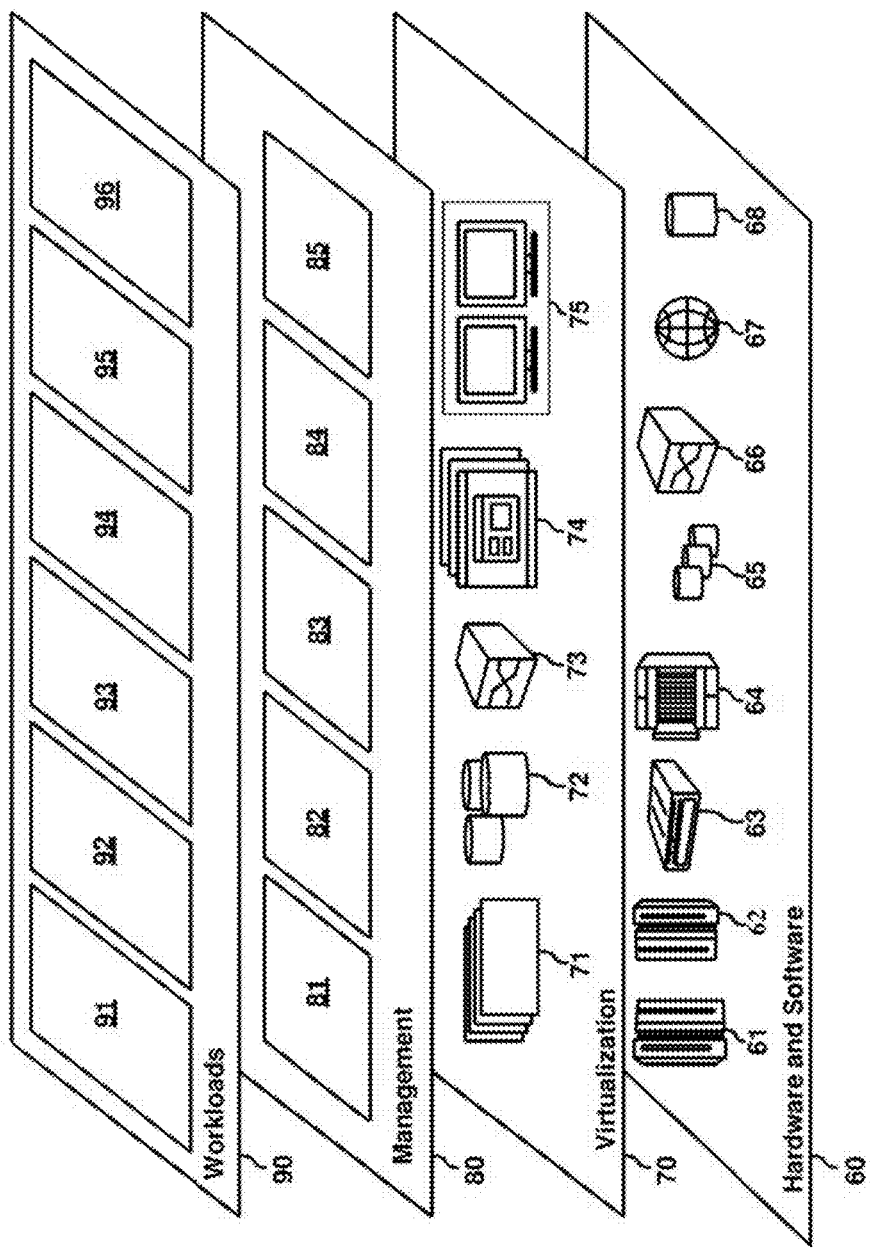
FIG. 6 depicts abstraction model layers, in accordance with an embodiment of the present invention.

Referring now to FIG. 6, a set of functional abstraction layers provided by cloud computing environment 50 (FIG. 4) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and environment 100 for detecting and responding to emotion in dialog systems.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of utilizing a computing device for detecting and responding to emotion in dialog systems, the method comprising:
   determining by the computing device a node emotion level for each dialog node in a dialog structure based on analysis of one or more intents of each dialog node;
   determining by the computing device emotional hotspot nodes in the dialog structure, the node emotion level for each of the emotional hotspot nodes exceeding an emotional threshold; and
   generating one or more responses modifying the node emotion level of each of the emotional hotspot nodes.

2. The method of claim 1, further comprising transmitting the one or more responses modifying the node emotion level of each of the one or more emotional hotspots to a dialog designer for approval.

3. The method of claim 2, wherein if the dialog designer rejects all of the one or more responses modifying the node emotion level, the dialog designer adds a dialog designer response created by the dialog designer.

4. The method of claim 2, further comprising:
receiving by the computing device a path traversal through the dialog structure, the path traversal representing a real-time dialog between an automated conversation agent and a dialog user;
determining by an online emotional rating algorithm an adjusted current emotion level for a node in the path traversal, the adjusted current emotion level adjusted for an emotion level of previous nodes in the path traversal;
determining whether the node in the path traversal was determined by the computing device to be one of the emotional hotspot nodes and whether the dialog designer approved the one or more responses modifying the node emotion level; and
presenting by the computing device one of the one or more responses when responding to the dialog user during the real-time dialog.

5. The method of claim 4, further comprising:
receiving by the computing device a window size for the online emotional rating algorithm, the window size being a number of sequential nodes in the path traversal accounted for by the online emotional rating algorithm, wherein the adjusted current emotion level is adjusted for the emotion level of a number of previous nodes in the path traversal according to the window size.

6. The method of claim 5, wherein the window size is received from the dialog designer.

7. The method of claim 4, wherein the computing device maintains a variable representing a number of responses presented to a dialog user during the real-time dialog, and previous to presenting the response to the dialog user modifying the emotion level, determining whether the variable representing the number of responses presented to the dialog user during the real-time dialog is not greater than a maximum number of responses during the real-time dialog.

8. The method of claim 4, wherein previous to the computing device presenting the approved response to the to the dialog user, determining whether a response was transmitted in an immediately previous node in the path traversal and, if not, presenting the approved response.

9. The method of claim 1, wherein the intent of each of the dialog nodes is designed to capture input of the dialog user.

10. The method of claim 1, wherein the intent of each of the dialog nodes is analyzed by analyzing each sentence of the dialog nodes in an intent-emotions probability vector, averaging the results of each analyzed sentence for the dialog node, and returning the average emotions vector.

11. The method of claim 1, further comprising:
updating an analysis of the one or more intents of each of the dialog nodes in the dialog structure and updating a determination of node emotion level for each of the dialog nodes based on the updated analysis of the one or more intents of each of the dialog nodes;
updating a determination of emotional hotspot nodes in the dialog structure, the updated node emotion level for each of the emotional hotspot nodes exceeding an update threshold; and
generating one or more new responses modifying the node emotion level of each of the emotional hotspot nodes.

12. The method of claim 11, further comprising transmitting the one or more new responses modifying the node emotion level of each of the one or more emotional hotspots to the dialog designer for approval.

13. The method of claim 12, further comprising:
receiving by the computing device a new path traversal through the dialog structure, the new path traversal;
determining by the online emotional rating algorithm a new adjusted current emotion level for the node in the new path traversal, the new adjusted current emotion level adjusted for a new emotion level of previous nodes in the new path traversal;
determining whether the node in the new path traversal was determined by the computing device to be one of the emotional hotspot nodes and whether the dialog designer approved the new response modifying the node emotion level; and
presenting by the computing device one of the one or more new responses modifying the node emotion level when responding to the dialog user during the real-time dialog.

14. The method of claim 1, wherein the computing device presents the one or more responses during the real-time dialog via a text conversation or a speech conversation.

15. A computer system for detecting and responding to emotion in dialog systems, the computer system comprising:
one or more computer processors;
one or more computer-readable storage media;
program instructions stored on the computer-readable storage media for execution by at least one of the one or more processors, the program instructions comprising:
program instructions to determine by the computer processor a node emotion level for each dialog node in a dialog structure based on analysis of one or more intents of each dialog node;
program instructions to determine by the computer processor emotional hotspot nodes in the dialog structure, the node emotion level for each of emotional hotspot nodes exceeding an emotional threshold; and
program instructions to generate one or more responses modifying the node emotion level of each of the emotional hotspot nodes.

16. The computer system of claim 15, wherein the program instructions further comprise program instructions to transmit one or more responses modifying the node emotion level of each of the one or more emotional hotspot nodes to a dialog designer for approval.

17. The computer system of claim 16, wherein the program instructions further comprise program instructions to:
program instructions to receive by the computer processor a path traversal through the dialog structure, the path traversal representing a real-time dialog between an automated conversation agent and a dialog user;
program instructions to determine by an online emotional rating algorithm an adjusted current emotion level for a node in the path traversal, the adjusted current emotion level adjusted for an emotion level of previous nodes in the path traversal;
program instructions to determine whether the node in the path traversal was determined by the computer processor to be one of the emotional hotspot nodes and whether the dialog designer approved the one or more responses modifying the node emotion level; and
program instructions to present by the computer processor one of the one or more responses when responding to the dialog user during the real-time dialog.

18. The computer system of claim 16, wherein if the dialog designer rejects all of the one or more responses modifying the node emotion level, the dialog designer adds a dialog designer response created by the dialog designer.

19. The computer system of claim 15, wherein the intent of each of the dialog nodes is designed to capture input of the dialog user.

20. The computer system of claim 15, wherein the intent of each of the dialog nodes in analyzed by analyzing each sentence of the dialog nodes in an intent-emotions probability vector, averaging the results of each analyzed sentence for the dialog node, and returning the average emotions vector.

\* \* \* \* \*